United States Patent [19]

Hubert

[11] Patent Number: 5,579,285
[45] Date of Patent: Nov. 26, 1996

[54] METHOD AND DEVICE FOR THE MONITORING AND REMOTE CONTROL OF UNMANNED, MOBILE UNDERWATER VEHICLES

[76] Inventor: Thomas Hubert, La Méridienne, Chemin Saint-Jacques, 13100 Le Tholonet, France

[21] Appl. No.: 454,125

[22] PCT Filed: Dec. 3, 1993

[86] PCT No.: PCT/FR93/01186

§ 371 Date: Aug. 21, 1995

§ 102(e) Date: Aug. 21, 1995

[87] PCT Pub. No.: WO94/14081

PCT Pub. Date: Jun. 23, 1994

[30] Foreign Application Priority Data

Dec. 17, 1992 [FR] France .................................. 92 15667

[51] Int. Cl.⁶ ............................. G01S 5/00; G01S 5/14; G01S 11/14
[52] U.S. Cl. ........................................................ 367/133
[58] Field of Search .............................. 367/133, 5, 131; 342/42, 357, 457

[56] References Cited

U.S. PATENT DOCUMENTS

| | | | |
|---|---|---|---|
| 4,315,326 | 2/1982 | Chase, Jr. .................................. | 367/134 |
| 4,622,557 | 11/1986 | Westerfield ............................. | 342/357 |
| 5,119,341 | 6/1992 | Youngberg ................................. | 367/5 |

FOREIGN PATENT DOCUMENTS

| | | |
|---|---|---|
| 2643463 | 8/1990 | France . |
| 2247379 | 2/1992 | United Kingdom . |

OTHER PUBLICATIONS

Youngberg, Navigation, vol. 40, No. 159, pp. 305–315.

*Primary Examiner*—Daniel T. Pihulic
*Attorney, Agent, or Firm*—Loeb & Loeb LLP

[57] ABSTRACT

A method and a device for remotely controlling and monitoring partially autonomous manned submersibles. The device comprises at least one manned floating vehicle (2) which is drifting and/or autonomous and comprises at least one first one-way communication receiver (3) with at least one first transmitter (4) for transmitting first positioning radio signals. Said floating vehicle comprises at least one two-way transceiver (5) with at least one second transceiver (6) for second messaging radio signals. The device comprises at least one land-based two-way transceiver (7) for communication with said second transceiver (6) for second messaging radio signals, and said floating vehicle (2) comprises at least one transceiver (8) for timing and data signals. Furthermore, said autonomous submersible comprises at least one timing and data signal transceiver (9) compatible with said transceiver (8) on the floating vehicle. Said method and device are useful in the field of underwater acoustic guidance and positioning systems.

10 Claims, 5 Drawing Sheets

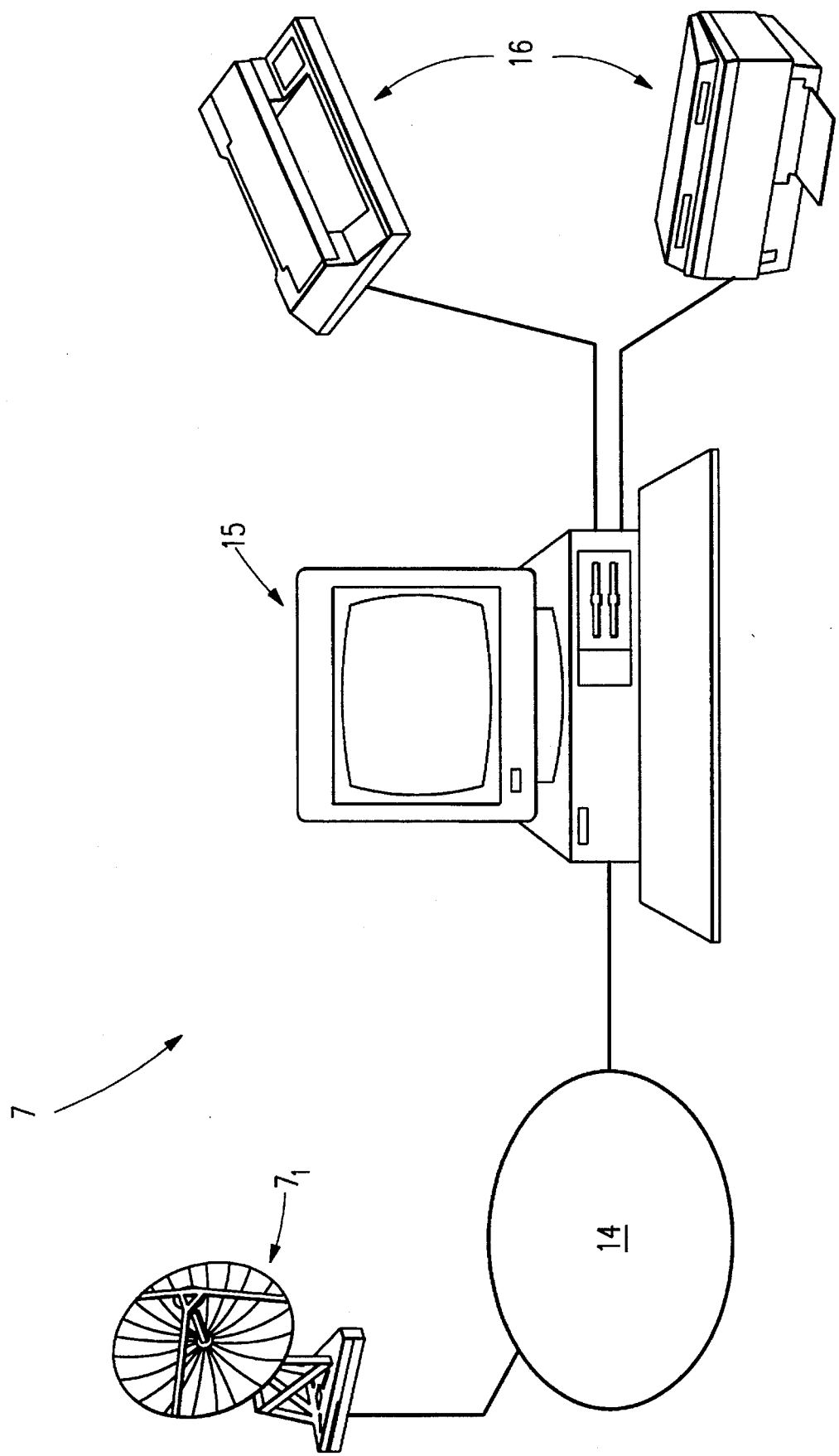

METHOD AND DEVICE FOR THE MONITORING AND REMOTE CONTROL OF UNMANNED, MOBILE UNDERWATER VEHICLES

The present invention relates to a method and device for the monitoring and remote control of unmanned, mobile, partly autonomous underwater vehicles.

The technical field of the invention is that of underwater acoustic positioning and guidance systems.

Various systems are already known for determining the position of an underwater object which make use, in particular, of acoustic signals.

French Patent 2 643 463 (SOFTWARE BASED SYSTEM) discloses a method and device for the absolute positioning of an underwater vehicle which transmits acoustic signals: this system uses two ships which are positioned relative to a fixed point of reference and one of which receives signals from a fixed point of reference, from the underwater vehicle, and from the other ship. According to the method disclosed in this document, on one of the ships data are collected which are deduced from the signals received, concerning in particular the absolute positions of the two ships and their relative positions, from which the absolute and relative position relative to one of the ships of the underwater vehicle is calculated as a function of the acoustic signals transmitted by the underwater vehicle and received by the two ships.

The system disclosed in this document allows an operator on one of the two ships to know the position of the underwater vehicle, but is not intended to permit the underwater vehicle to know its own position. The general problem posed consists in procuring a system whereby an offset monitoring device can know the position of an underwater vehicle and whereby underwater submersibles likewise can know precisely at any moment their path data within an absolute frame of reference or relative to the theatre of operation.

Also known from the publication "A new method for the underwater use of GPS", J. W. YOUNGBERG, Navigation, no. 159, July 1992, and from U.S. Pat. No. 5,119,341 (Youngberg) is a system for providing a navigation service to unmanned underwater vehicles. The system comprises drifting buoys which translate radio signals from the GPS into acoustic signals which can travel through water, so that the autonomous underwater vehicle receiving the acoustic signals transmitted by the drifting buoys can determine its position by measuring the pseudo-ranges separating it from a certain number of buoys, as well as through the knowledge of the position of each buoy, which is determined by each of them and which is transmitted to the underwater vehicle by acoustic signals.

Although the device disclosed in the latter document allows an underwater vehicle to determine its position relative to an absolute frame of reference, the known positioning systems do not permit the monitoring and remote control of an autonomous underwater vehicle.

Furthermore the techniques presented in the latter document do not permit finely-tuned, precise guiding of the vessel, taking account of the sizeable output of data to be transmitted by various underwater acoustic channels. The device disclosed is furthermore thoroughly indiscreet due to the very large amount of data being transmitted to the underwater vehicle.

The problem posed consists more particularly in providing monitoring and remote coordination of one or more unmanned underwater vehicles whose mission is to meet in a target zone or at one or more target points, e.g. for a mission to measure physical or chemical parameters of the environment or for sounding the depth of the sea or more particularly for missions of observation and reconnaissance of sites on land or at sea located in the region of a predetermined maritime zone, or else for missions of deception and counter-measures.

The solution to the problem posed consists in procuring a device for the monitoring and remote control of one or more unmanned underwater vehicles for use in reconnaissance missions in particular, and for the auto-positioning thereof, comprising at least one, preferably at least two mobile, floating (i.e. drifting and/or self-propelling), unmanned vessels, each comprising at least a first receiver for monodirectional communication via first radio signals with at least a first transmitter, such as a positioning satellite forming part of a satellite network such as the GPS network, each of said floating platforms comprising at least one transmitter-receiver for bidirectional communication via second radio signals with at least a second transmitter-receiver, e.g. such as a data communication satellite forming part of a stationary satellite network such as the network INMARSAT; said device further comprises at least one land-based transmitter-receiver for bidirectional communication via third radio signals with the second transmitter-receiver, such as a data communication satellite: each of the floating platforms comprises at least one transmitter-receiver or signal transducer for data and synchronisation signals, e.g. acoustic signals, and the unmanned underwater vehicle comprises at least one transmitter-receiver or transducer for data and synchronisation signals, e.g. acoustic signals which are compatible with the transmitter-receiver of the floating platform.

Alternatively, the first transmitter of first radio positioning signals of the floating platforms may be a land-based transmitter such as AXYLE; this solution may be particularly advantageous for the monitoring and remote control of the unmanned underwater vehicle close to coastlines, and can be extremely precise; in this application, therefore, provisions can be made to correct the discrepancy of position between a surface aerial receiving the first radio signals by said floating platform and the transducer, e.g. acoustic, for data and synchronisation signals, taking into account signals delivered by sensors for measuring roll, pitch, heading and heave installed on board the floating platform; with this configuration it is possible to ensure the control and command of the unmanned autonomous underwater vehicle in a "high-definition" mode of underwater navigation.

Alternatively to the navigation system by satellite, the second radio signals may form part of a surface communication network for the exchange of data between the buoys or group of buoys and the offset control device(s), such as floating platforms, ships or aircraft.

This type of configuration permits particularly efficient coordinated management of different underwater vehicles which are partly autonomous and which benefit from the extremely high speed of propagation of the radio waves in comparison to the speed of propagation of underwater acoustic waves.

These data and synchronisation signals may be exchanged between the floating platform and the autonomous underwater vehicle via the acoustic signal transducers, for example, or alternatively by a fibre-optic link reeled off from the underwater vehicle and/or the floating platform, or by a sheathed or coated electrically conductive wire likewise reeled off from the underwater vehicle and/or the floating platform.

In a particular embodiment, the floating platform may comprise a synchronising clock based on the reception of the first radio signals transmitted by said first transmitter, such as a GPS satellite.

Advantageously, the underwater vehicles comprise holding, docking, and storage means for at least one floating platform, and means of releasing or launching said floating platform.

The solution to the problem posed also consists in using a device according to the invention via a method of monitoring and remote control of an unmanned, partly autonomous underwater vehicle and for positioning same, comprising the following operations:

a) procuring a device according to the invention, b) in a recording operation prior to the launch of the vessel, in at least one memory of a computer of the underwater vehicle, functions are stored for the behaviour of the vessel according to different modes of navigation and preferably at least one path-following mode, comprising equations for speed, course and submersion as a function of time, submersion, altitude or distance of the vehicle from underwater obstacles, or these functions are transmitted into the marine environment via the second and third radio, signals transmitted through the marine environment via the transducer of the floating platform, c) in a transmission operation, coded acoustic signals representing changes in mode of navigation or guidance orders of the underwater vehicle(s) are transmitted into the underwater environment, preferably at regular intervals, d) in a computing operation, the computer on board the underwater vehicles generates from the acoustic signals transmitted by the floating platform(s) monitoring and guidance signals corresponding to the most recent navigation mode received and transmits via its transducer a series of coded acoustic pulses representing the status (course, speed, submersion, altitude, . . .) measured on board.

The method according to the invention can be applied advantageously to intelligent weapons for neutralising mines; this application, which could advantageously make use of the high-definition underwater navigation mode cited above, avoiding a forward-looking sonar or long-range optical imaging equipment (laser). The charge embarked on the underwater robot could be ignited by simple geographic proximity of the target point corresponding to a virtual position of a mine to be neutralised, which virtual mine position can be previously located with precision by a frontal or lateral sonar incorporated in the mobile reconnaissance underwater vehicle using the device according to the invention.

In other words, the invention consists in implementing a method of monitoring and remote control of an autonomous, unmanned underwater vehicle and guidance thereof comprising the following operations:

a) a device according to the invention is procured, b) prior to the launch of the underwater vehicle, in at least one memory of a computer of the underwater vehicle at least one target position to be hit is recorded, and preferably at least one speed for the approach trajectory, and at least one position for a point of departure or launch, or these positions and trajectory are transmitted via the second and third radio signals, which are transformed into acoustic signals and transmitted into the marine environment by the transducer of the floating platform.

c) a "master" floating platform is put into action, d) from an underwater vehicle, coded acoustic signals representing the status known on board and acoustic synchronisation signals representing the time relative to an origin of universal common time are transmitted into the underwater environment, preferably at regular intervals, e) at the surface, the geographic coordinates of the underwater vehicle are determined, f) from the surface, corrective guidance instructions are transmitted to an underwater vehicle concerning its trajectory.

Advantageously a method according to the invention comprises the following operations:

a) the autonomous underwater vehicle is released, or launched, preferably from a manned craft, such as a ship or from a manned underwater vehicle, at a point of departure located in a first maritime zone and at a distance from the target position of 500 m to 500 km for example, preferably between 10 and 200 km, and for example close to 50 to 150 km.

b) when the underwater vehicle reaches a second maritime zone separated from the first by a dividing line at a distance from the target point preferably of less than 10 km, e.g. close to 1 to 10 km, by means of a program recorded in a memory of a computer of the autonomous underwater vehicle, at least one proximity floating platform is launched, which was previously docked on the autonomous underwater vehicle or contained therein, by triggering the means for releasing said floating platform, which then rises to the surface and permits precise positioning of the autonomous underwater vehicle by virtue of the positioning satellite, and permits the relay of bidirectional communication between the autonomous underwater vehicle and a land-based monitoring station via the second data communication satellite, c) when the reconnaissance mission of the autonomous underwater vehicle is complete, the underwater vehicle steers to a rendez-vous zone preferably located in the first maritime zone, in which at least one, for example two, of the floating platforms were launched or are drifting or sailing, these floating platforms permitting precise positioning of the autonomous underwater vehicle at a rendez-vous point where it is recovered by the manned floating or submarine vessel.

Advantageously, the autonomous underwater vehicle determines its position by only one of the floating platforms, by performing the following operations:

a) the underwater vehicle at a given moment launches the "master" floating platform, into which the theoretical coordinates of the launch point and the data for speed, course and submersion of the underwater vehicle have been previously remote-programmed;

b) the underwater vehicle transmits at the instants T1 and T2 synchronisation signals, c) the "master" floating platform dates the instants of arrival at the surface of the signals T1 and T2 transmitted and deduces therefrom the distances D1 and D2 to the underwater vehicle, d) the floating platform determines, by calculation from these distances (d1, d2) and from the module (L) and the orientation (C) of displacement, the coordinates of the two points (A1, B1) corresponding to the possible position of the underwater vehicle, e) the floating platform determines which of the two points (A1, B1) corresponds to the real position on the basis of data for the known position prior to the instant (t1, f) the floating platform transmits via the acoustic underwater channel the fix data of the navigation system on board the underwater vehicle or the new path data.

Advantageously, in a method according to the invention, the autonomous underwater vehicle determines its position by using the following operations:

a) the underwater vehicle determines by means of its onboard apparatus its submersion, its approximate position, the module (L) and orientation or course (C) of the vector corresponding to its future displacement between the instants (t1) and t2), these data being entered into the memory of a floating platform, b) the floating platform determines at one moment or instant (t1), then consecutively at a moment or instant (t2), a distance or pseudo-range (d1) or (d2) respectively separating it from an underwater vehicle by means of the acoustic signals transmitted by the underwater vehicle, c) the floating platform determines, by calculating from the distances (d1, d2), the module (L) and the orientation (C) of the displacement, the coordinates of two points (A1, B1) corresponding to the possible position of the underwater vehicle, d) the floating platform determines which of the two points (A1, B1) corresponds to the real position of the underwater vehicle on the basis of data previously stored in its memory, e) the floating platform transmits to the underwater vehicle the position correction data.

By means of the invention it is possible to transmit instructions or data over a very long distance from a land-based or floating sea-based monitoring station to one or more autonomous unmanned underwater vehicles, in order to move these vessels to a zone or target point in which they will be able to identify and locate in a very precise manner physical phenomena or objects to be monitored; the invention further permits the underwater vehicle to report on its reconnaissance mission throughout the duration thereof to an operation control and command centre located at very long-range, and to decide upon action to be taken on the basis of instructions received, as well as to report at long-range on the successful execution of the actions or instructions received.

In a preferred embodiment of the device according to the invention, this incorporates one or more autonomous unmanned underwater vehicles, a plurality of orbiting or stationary satellites, at least one offset control monitoring station, and at least one, preferably more than one, floating platform such as buoys, ships, free autonomous surface or sub-surface vessels.

Each of the autonomous reconnaissance underwater vehicles may be shaped as a torpedo, for example, equipped with electric propulsion which permits it for example to move at a speed of 5 to 10 knots with an autonomy of 5 hours to several days; each of the autonomous underwater vehicles is equipped with a temperature-compensated clock, an acoustic transmitter-receiver, and a sequencing computer at least.

According to the missions imparted to it and the modes of navigation, the vessel may further comprise a gyroscope, a Doppler log, a submersion or depth sensor, an obstacle-avoidance sonar, an altimeter, and various appliances for measuring or recording data being sought, such as for example a video camera, a side-scan sonar, a depth sounder, a listening device; during execution of the observation mission, the autonomous underwater vehicle will be able to know its position, i.e. its geographic coordinates (latitude and longitude) with a precision which varies according to the different phases of its mission, and which may be of the order of three hundred meters during stages of homing on to a target site or of a rendez-vous zone, and of a greater precision of, for example, five to twenty-five meters during the final approach and positioning at the point of observation and at the point of rendez-vous.

Furthermore, the autonomous underwater vehicle may receive at any moment instructions which may affect the course of its mission, and it can report back to the land-based monitoring and control post regarding its state, its position and the data collected.

The autonomous underwater vehicle is advantageously equipped with means for receiving coded numeric messages via the acoustic channel, which are transmitted by one of the surface floating platforms and which may contain data of a different nature, such as:

a) instructions affecting the mission of the autonomous underwater vehicle, b) data concerning the mode of navigation or guidance, c) enquiries for data relative to the state of the autonomous underwater vehicle and/or the execution of its reconnaissance mission.

The underwater vehicle is preferably equipped with means for receiving acoustic signals transmitted from the surface of the sea by the floating platforms at predetermined instants preferably synchronised relative to a universal time.

The autonomous underwater vehicle is also equipped with means of transmitting acoustic signals coded in time-frequency and acting as carriers for data concerning the state of the underwater vehicle, and means of transmitting acoustic signals at precisely predetermined instants which are preferably synchronised relative to a universal time.

The functioning of the underwater vehicle can be effected under the guidance of a sequencing computer ensuring in particular the following functions:

a) analysis of the acoustic signals received: decoding of frames, generation of the order of transmission and acknowledgement of reception, transfer to the on-board central computer of the order received, b) return of data concerning status: via the acoustic channel to enquiries after interrogation of the on-board central computer, c) management of piloting modes, d) management of the vessel trajectory: dispatch to on-board central computer of instructions concerning speed, course, submersion and attitude (roll, pitch, yaw), e) making a decision in case of incident f) execution of a procedure for launching buoys.

The package of means of spatial communication is based on the deployment of orbiting or stationary satellites which ensure three major functions:

a) intelligence: here, orbiting observation satellites are used, which have optical, radio and infrared sensors as well as altimeters (Helios etc.), b) positioning: typically the function of satellites of the GPS or GLOSNASS networks, which permit high-precision positioning of vehicles on the Earth's surface and a recurrence of the order of the second by the reception of coded signals transmitted by a "galaxy" of 22 orbiting satellites effecting global cover without interruption in time or space, c) navigation: the device based on the use of orbiting or stationary data communication satellites makes it possible to carry out telecommunications in "quasi-real" time between the ground-based monitoring and control station and the surface floating platforms.

This is one of the functions of the stationary INMARSAT satellites, whose transmission standard is STANDARD "C".

The ground-based monitoring and control means comprise four subunits:

a) the ground-based infrastructure for communication with said satellites, more particularly: ground-based GPS stations, ground-based INMARSAT stations, ground-based stations of the intelligence satellite, b) one or more differential GPS measuring stations whose function is to improve the positioning accuracy of the surface mobile floating platforms by a measure at ground level of the drift of the GPS system, c) land-based networks for transmitting data such as: line-commutated telephone network, Transpac network, Numeris network, military network, d) an operational centre comprising; access points to numeric networks, computing means, one or more work stations, means for plotting the data (cartography, trajectography, image printing).

In certain cases, the support of the control monitoring means may be, for operational reasons, a ship or aircraft, possibly unmanned, deployed-close to the theatre of operation.

The means for relaying communication and positioning consist of one or more floating platforms which may be:

a) a buoy launchable from an aircraft, a surface building or an underwater vehicle, b) a surface ship, c) a free, autonomous, surface or sub-surface vessel.

These floating platforms are of two types:

a) a "master" floating platform comprises at least one "C"-Standard navigational transmitter-receiver, a positioning GPS receiver, a clock, an acoustic transmitter-receiver, a specialised processor for computing and exchanging data, and a radio transmitter-receiver (as a modification);

b) an "elementary" floating platform comprises a GPS receiver, a clock, an acoustic receiver, a "C"-standard transmitter-receiver, a specialised processor for computing and exchanging data, and a radio transmitter-receiver (as a modification);

The functions carried out by the "master" floating platform are:

a) reception of its own GPS position in latitude and longitude and possible computation of its drift in course and speed and its attitude, b) reception of "C"-standard or radio messages of various types: commands addressed to the autonomous underwater vehicle, differential GPS correction, coordinates of the adjacent floating platforms and dating of the acoustic signals received, enquiries relative to floating platform status, enquiries relative to underwater vehicle status, c) reception by the acoustic channel of frames corresponding to the status of the underwater vehicle, d) dating in universal time of the instants of detection of the acoustic signals transmitted synchronously by the underwater vehicle, e) "C"-standard transmission of messages of the type: status of buoys or floating platforms, status of the underwater vehicle, dating, f) possible local computation of position of the vessel via methods using pseudo-ranges and associated corrections, g) acoustic transmission: relaying of instruction signals to the underwater vehicle, transmission of enquiries, transmission of synchronous signals.

The basic functions of the elementary float (floating platform) are the "C"-standard or radio transmission of the position and attitude of the float and dating of the reception of acoustic signals.

The capability to transmit numeric data with the INMARSAT system in "quasi-real" time is used to transmit to the buoy the position corrections to be sent to the GPS receiver (GPS-DIFFERENTIAL navigation mode).

On board the buoy, the best estimate of its position in latitude and longitude is calculated by applying corrections to the GPS fix issued by the on-board receiver.

The transmission channel is an acoustic channel, actuating a transducer submerged to an optimum depth, taking account of the local bathycelerimetric conditions.

The transducer transmits acoustic signals as a data frame; its main features are:

an omnidirectional transducer, transmission preferably within a narrow band or wideband spectrum, cycles synchronised with universal time, fixed recurrence of transmission of frames of data or in quasi-random cycles (temporal evasion), multispectral coding and spatio-temporal redundancy, coding for computing upon reception a confidence indicator (factor of quality of the transmission).

The device and method according to the invention can be used advantageously to confirm the position of navigation equipment of a submerged submarine.

The numerous advantages of the invention will become clearer throughout the following description, which refers to the attached drawings illustrating non-limitatively a preferred embodiment of a device according to the invention and its modus operandi.

FIG. 3 shows diagrammatically the main components of a land-based monitoring and control station forming part of a device according to the invention.

Figure 1:
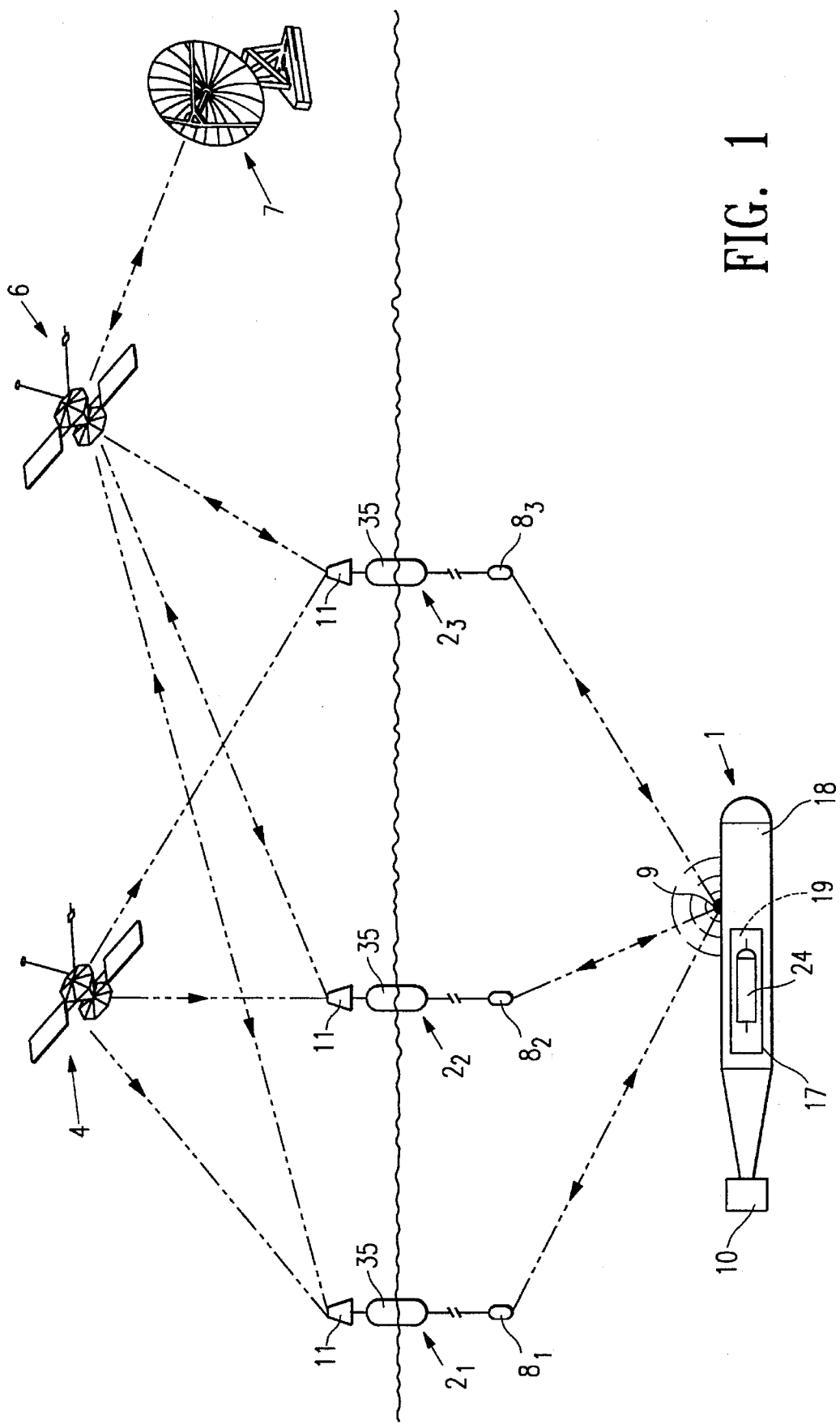
FIG. 1 shows diagrammatically the main components of a monitoring and remote control device for an underwater vehicle according to the invention and its operating principle.

FIG. 1 shows a partially autonomous underwater vehicle 1 equipped with propulsion and steering means 10, the shell of said underwater vehicle possibly taking the form of a torpedo comprising at least one acoustic transducer 9, which permits it to communicate, i.e. to transmit and receive signals respectively transmitted and received by floating platforms such as buoys 21, 22, 23.

Advantageously the autonomous underwater vehicle comprises a space or storage means 19 inside the body or shell 18, which storage space 19 may communicate with the exterior by means of a trap-door 17, which may be opened or closed according to control commands received by the autonomous underwater vehicle 1; thus according to the commands received and the mission of the underwater vehicle, it is possible for the underwater vehicle to release or launch a floating platform 24 previously disposed in the storage space 19 and capable of thus detaching itself or emerging from the underwater vehicle 1 in order to rise to the surface and play its part in relaying communications between the underwater vehicle and a satellite, in particular when the underwater vehicle is approaching a point or geographical location corresponding to the target of its mission.

Each of the buoys 21, 22, 23 comprises a float 35, which receives in its upper part an aerial 11 for receiving and/or transmitting radio signals, the floating platform or buoy also comprising respectively a transducer or transmitter-receiver for acoustic signals referenced 81, 82, 83 respectively.

Each of the floating platforms or buoys may on the one hand receive radio signals transmitted by positioning satellites 4, by means of which a computer incorporated in each of the buoys can determine precisely the position of said buoy, preferably at regular time intervals.

Each of the buoys can on the other hand receive and transmit second radio signals to or from a second data communication satellite 6, which permits the transmission, via the second radio signals, of mission commands (i.e. data representing commands) being sent to the underwater vehicle, or in another context, data relating to the coordinates of the buoy, to the dating of the arrival of acoustic signals, to the status of the underwater vehicle which can thus be transmitted via the second satellite 6 to a land-based control and monitoring station 7.

FIG. 3 shows that advantageously the control monitoring station 7 can incorporate a transmitter-receiver 71 for bidirectional communication via third radio signals with the data communication satellite (referenced 6 in FIG. 1); this land-based station, which can be connected to the transmitter-receiver 71 by a terrestrial communication network 14 of the telephone network or data network type, permits a central control computer 15 to exchange a dialogue with the underwater vehicle; the central computer is preferably connected to peripheral units 16 such as plotters or printers, making it possible to edit reports concerning the state of the underwater vehicle or communications which have taken place, i.e. transmitted or received from the underwater vehicle.

Figure 2:
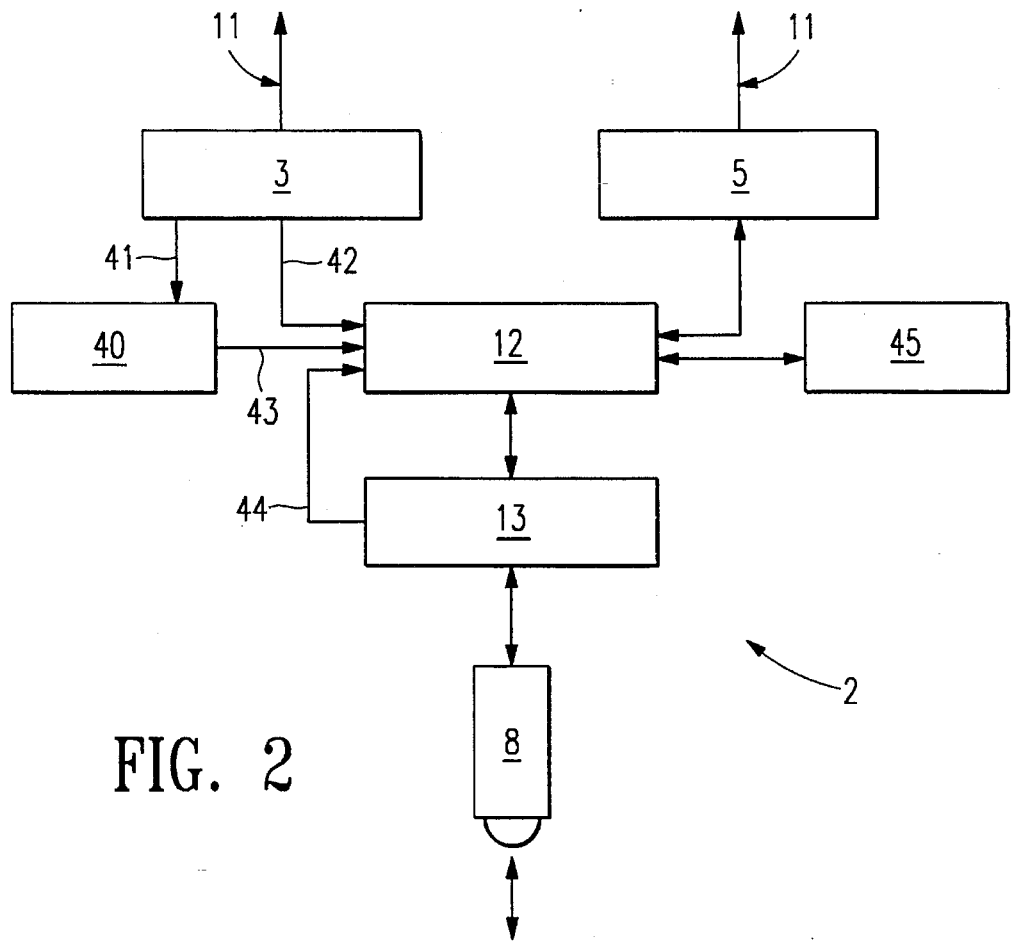
FIG. 2 shows diagrammatically the main components of a floating platform forming part of a device according to the invention.

With reference to FIG. 2, it can be seen that a floating platform comprises an aerial 11 at least intended to pick up signals which will be detected and amplified and processed on the one hand by a receiver 3 of the positioning radio signals transmitted by the positioning satellites. A clock 40 is synchronised by the connection 41. The detection by the acoustic processor 13 of the arrival of an acoustic signal prompts the computer 12 to read through the connection 42 the position of the buoy, and prompts the computer 12 to read through the connection 43 the precise dating of this instant of arrival, and through the connection 44 reading of the type of pulse received.

Figure 4:
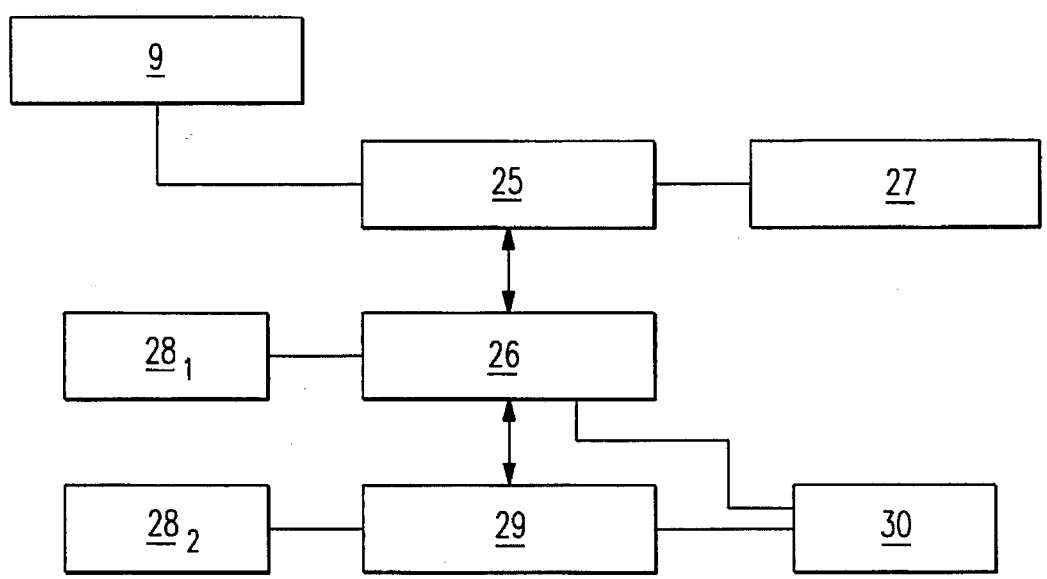
FIG. 4 shows diagrammatically the main components of the means of communication and monitoring and control incorporated in an autonomous underwater vehicle of a device according to the invention.

With reference to FIG. 4, it can be seen that the autonomous underwater vehicle 1 comprising the acoustic transducer 9 advantageously comprises an acoustic processor 25 for processing signals being sent to the transducer 9 or received by the transducer 9, which signals can be dated by a high-precision quartz clock 27. An on-board central computer 29 communicates with the mission and guidance processor 26 and interprets the guidance instructions and directives received and manages the sensors and actuators of the vessel according to the preprogrammed navigation modes. The assembly can be powered by batteries 30; advantageously, each of the processors 26 and 29 is connected to at least one memory 281, 282 respectively, in which are recorded in particular the navigation modes and path data.

Figure 5:
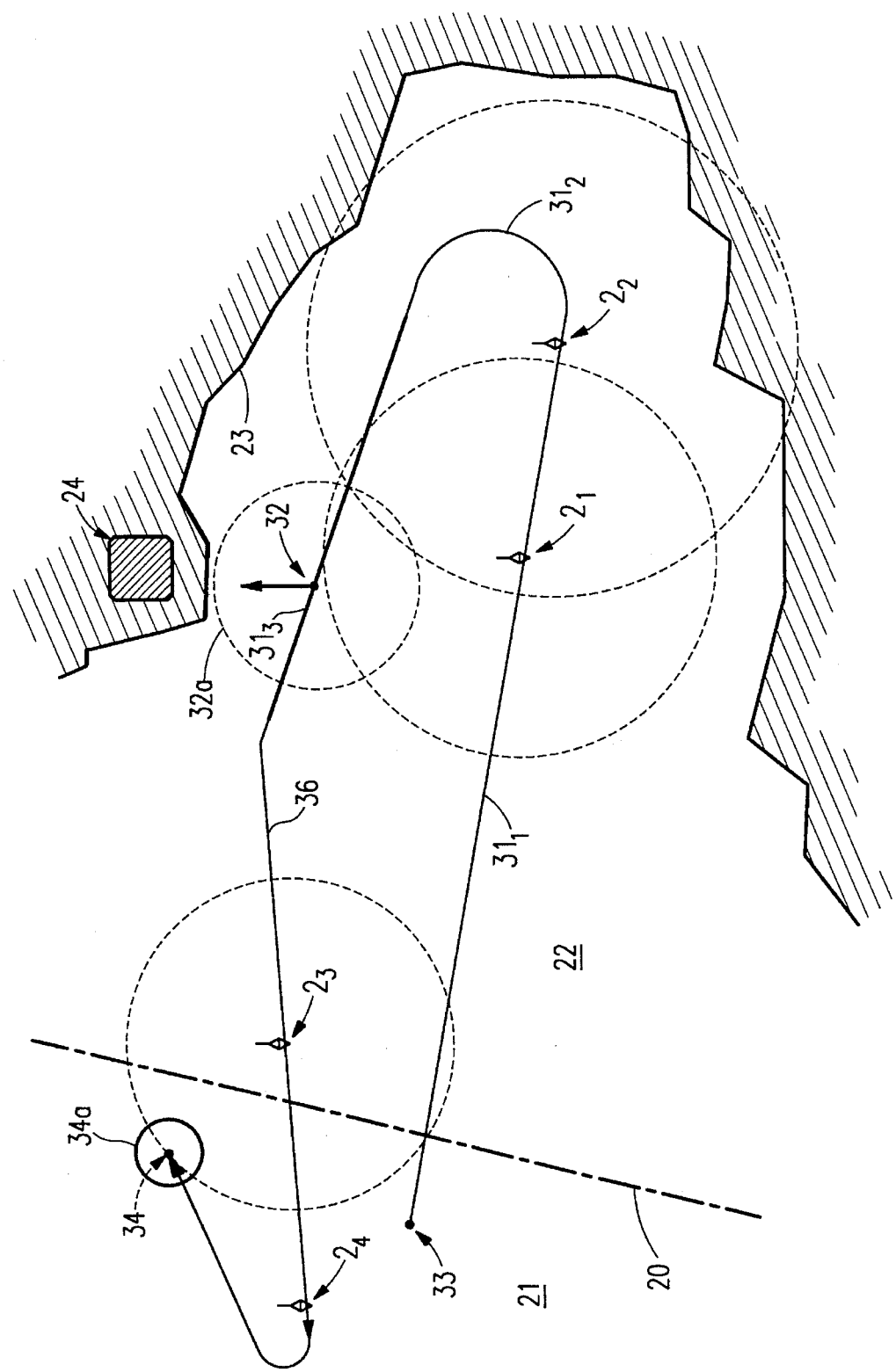
FIG. 5 shows diagrammatically stages in a method of using a device according to the invention to make an autonomous underwater vehicle carry out a reconnaissance mission.

With reference to FIG. 5, it can be seen that in a particular application of the device according to a method according to the invention, the underwater vehicle (not shown) can be launched at a point of departure 33 located in a maritime zone 21, which may correspond for example to a zone of international waters, and which is separated from a second maritime zone 22 corresponding for example to a zone of territorial waters, the first and second zones being separated by a separating or demarcation line 20.

According to a particular embodiment of a reconnaissance mission executed by the autonomous underwater vehicle, the vessel moves first of all from the point of departure 33 to a target zone 32a following a predetermined trajectory previously recorded in a memory of the underwater vehicle, said trajectory comprising a rectilinear section 311 and a curved section substantially forming an arc of a circle 312; advantageously, before arriving in the target zone 32a, the autonomous underwater vehicle may launch two floating platforms; one floating platform known as the "master" 21, and one known as the "elementary" floating platform 22, which after rising to the surface permit the underwater vehicle to receive very exact guidance instructions within the target zone 32a, in particular at a target point 32; the underwater vehicle therefore follows a predetermined trajectory 313, during which the underwater vehicle may surface for example, get a fix on its navigation by means of an optional GPS receiver, and carry out filming of a target of particular interest 24 located in a coastal zone 23.

After the autonomous underwater vehicle has completed its mission and transmitted the data collected, via the radio transmission means using the data communication satellite the underwater vehicle can return to a rendez-vous zone 34a by following a return trajectory 36, the underwater vehicle being capable of positioning itself precisely at a rendez-vous point 34 located in the rendez-vous zone 34a by using two further floating platforms 23 and 24.

Figure 6:
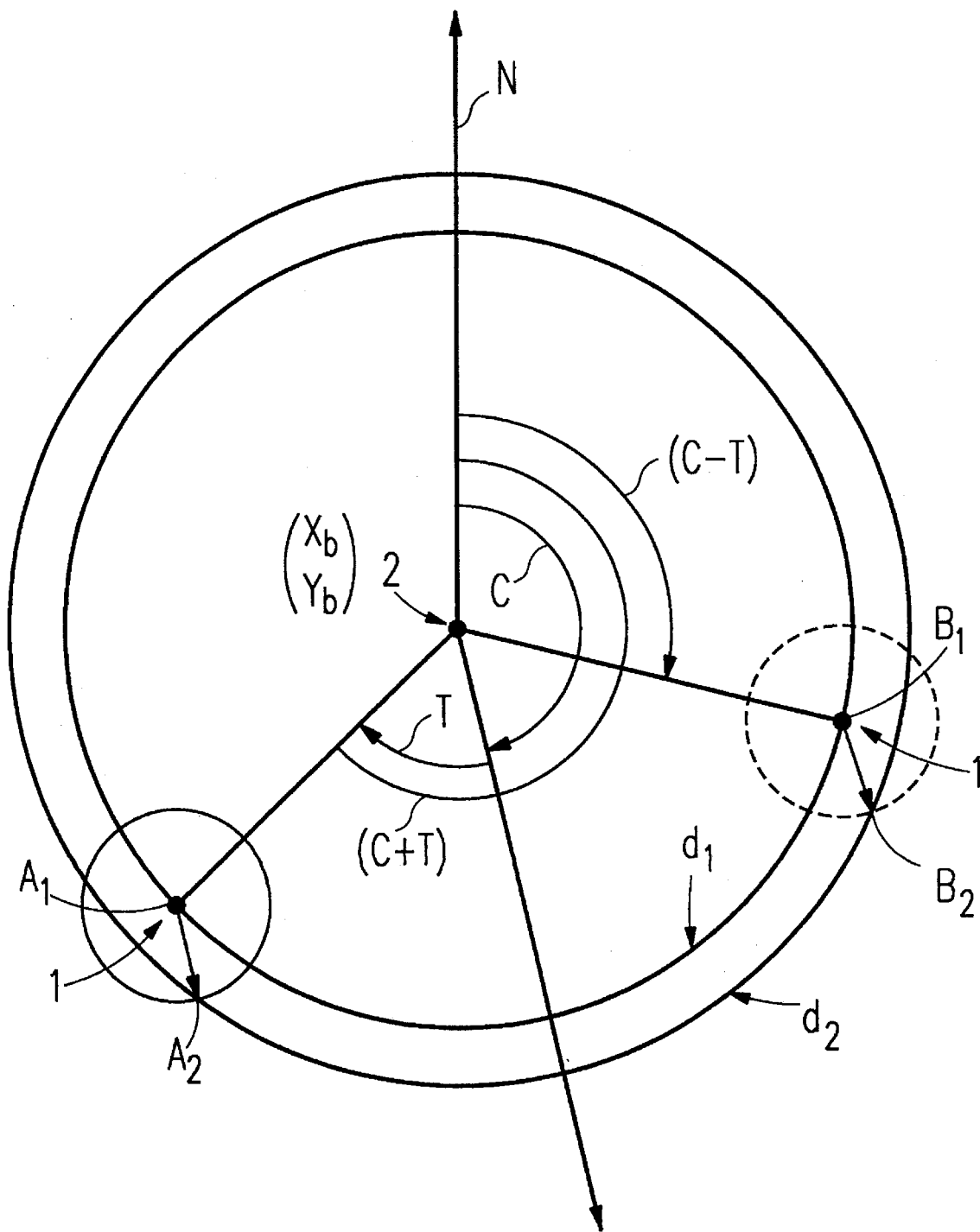
FIG. 6 shows diagrammatically stages in a method of positioning an underwater vehicle using signals transmitted by a single floating platform of a device according to the invention.

With reference to FIG. 6, in a preferred embodiment of a method according to the invention, the underwater vehicle 1 can position itself by means of signals received and transmitted by a single "master" floating platform 2.

The floating platform 2 determines the coordinates xb and yb of its current position by means of the radio signals received from the positioning satellite.

The floating platform 2 determines by means of the dating of the acoustic signals received from the underwater vehicle 1 the distance d1 separating the floating platform 2 from the underwater vehicle 1 at an instant t1, and determines in the same manner the distance d2 separating it from the floating platform at a consecutive instant t2.

The floating platform 2 knows at the moment of launching the estimate known position, the module L and the orientation or course C of the programmed displacement of the vessel and its submersion between the instants t1 and t2; the position of the underwater vehicle 1 at the instant t1, as is indicated at FIG. 6, may correspond to one of the points A1 and B1 located on a circle having for a diameter the distance d1, centred on the floating platform 2, corresponding to the references A2 or B2 respectively at the instant t2, which are located on a circle of diameter equal to the distance d2 and centred on the floating platform.

Since the reference C designates the course of the underwater vehicle relative to the axis N representing north, the relative bearing of the points A1 and B1 may, as is shown in FIG. 6, be determined from the course C as being equal to (C+T) or (C−T).

The angle T can be determined by the formula:

$$\cos(T) = (d2^1 - d1^2 - L^2)/(2Ld1)$$

The coordinates of the points A1 and B1 can therefore be determined respectively by the following formulae:

$$XA1 = Xb + d1 \sin(C+T) + L \sin(C)$$

$$YA1 = Yb + d1 \cos(C+T) + L \cos(C)$$

$$XB1 = Xb + d1 \sin(C-T) + L \sin(C)$$

$$YB1 = Yb + d1 \cos(C-T) + L \cos(C).$$

Since the position of the underwater vehicle is unknown at the instant t1, there are in fact only two possible positions corresponding to the equation system above, which corresponds to the solution of the graphic problem consisting in positioning the origin of the displacement vector on a circle of radius d1, and the extremity of the displacement vector on the circle likewise centred on the position of the floating platform and having a diameter d2; the casting of doubt on the real position of the underwater vehicle between the points A1 and B1 is effected by a priori knowledge of the position of the underwater vehicle by virtue of the data concerning its last-determined position.

Since these positions are known, the master buoy transmits to the underwater vehicle its new guidance directives.

In a particular application of a method according to the invention, the so-called floating platforms can be disposed below or on (and/or rigidly connected to) the ice floe.

I claim:

1. Device for the monitoring and remote control of an unmanned autonomous underwater vessel (1) and for the positioning thereof, characterised in that it comprises at least one drifting and/or autonomous unmanned floating vessel (2) comprising at least one first receiver (3) for monodirectional communication with at least a first transmitter (4) of first positioning radar signals, said floating vessel comprising at least one transmitter-receiver (5) for bidirectional communication with at least a second transmitter-receiver (6) of second navigation radar signals, said device comprising at least one land-based transmitter-receiver (7) for bidirectional communication with the second transmitter-receiver (6), the floating vessel (2) comprising at least one transmitter-receiver (8) for data and synchronisation signals, said autonomous underwater vessel comprising at least one transmitter-receiver (9) for data and synchronisation signals compatible with the transmitter-receiver (8) of the floating vessel.

2. Device according to claim 1, characterised in that the underwater vessel comprises means of docking at least one floating vessel and means of releasing said floating vessel.

3. Device according to claim 1, characterised in that the transmitter (4) of first, positioning radar signals consists essentially of one or more satellites.

4. Device according to claim 1, characterised in that the transmitter-receiver (6) for navigation radar signals consists essentially of one satellite or a local radar network.

5. Process for the monitoring and remote control of an unmanned autonomous underwater vessel (1) and for guiding same, characterised in that it comprises the following operations:

a) a device according to claim 1 is procured, b) in at least one computer memory (28) of a computer (26, 29) of the underwater vessel (1), at least one target position (32) to be hit, preferably at least one speed for the approach trajectory (31), and at least one position for a point of departure (33) or launch are recorded prior to the launch of the underwater vessel, or these positions and trajectory are transmitted via the second and third radar signals, which are transformed into acoustic signals and transmitted into the marine environment by the transducer of the floating vessel, c) a "master" floating vessel is put into action, d) from an underwater vessel, coded acoustic signals representing states known on board and acoustic synchronisation signals representing the time relative to an origin of universal common time are transmitted into the underwater environment, preferably at regular intervals, e) at the surface, the geographic coordinates of the underwater vessel are determined, f) from the surface, corrective guidance instructions are transmitted to a underwater vessel concerning its trajectory.

6. Process according to claim 5, characterised in that it comprises the following operations:

a) the autonomous underwater vessel is released, or launched, preferably from a manned craft such as a ship or from a manned underwater vessel, at a point of departure (33) located in a first maritime zone (21) and at a distance from the target position of 500 m to 500 km for example, b) when the underwater vessel reaches a second maritime zone (22) at a distance from the target point (32) of preferably under 10 km, by means of a program recorded in a memory of a computer of the autonomous underwater vessel, at least one proximity floating vessel is launched, which was previously docked on the autonomous underwater vessel or contained therein, by triggering the means for releasing said floating vessel, which then rises to the surface and permits precise positioning of the autonomous underwater vessel by virtue of the positioning satellite, and permits the relay or bidirectional communication between the autonomous underwater vessel and a land-based monitoring station via the second navigation transmitter-receiver, c) when the reconnaissance mission of the autonomous underwater vessel is complete, the underwater vessel steers to a rendez-vous zone preferably located in the first maritime zone, in which at least one, for example two, of the floating vessels were launched or are drifting or sailing, these floating vessels permitting precise positioning of the autonomous underwater vessel at a rendez-vous point (34) where it is recovered by the manned floating or submarine vessel.

7. Process according to claim 5, characterised in that the autonomous underwater vessel determines its position by using the following operations:

a) the underwater vessel determines by means of its on-board apparatus its submersion, its approximate position, the module (L) and orientation or course (C) of the vector corresponding to its future displacement between the instants (t1) and t2), these data being entered into the memory of a floating vessel (2), b) the floating vessel (2) determines at one moment or instant (t1), then consecutively at a moment or instant (t2) a distance or dummy distance (d1) or (d2) respectively separating it from an underwater vessel (1) by means of the acoustic signals transmitted by said underwater vessel, c) the floating vessel (2) determines, by calculating from the distances (d1, d2), the module (L) and the orientation (C) of the displacement, the coordinates of two points (A1, B1) corresponding to the possible position of the underwater vessel (1), d) the floating vessel determines which of the two points (A1, B1) corresponds to the real position of the underwater vessel on the basis of data previously scored in its memory, e) the floating vessel (2) transmits to the underwater vessel (1) the position correction data.

8. Process according to claim 5, characterised in that it is used for neutralising mines.

9. Process according to claim 5, characterised in that it is used to confirm the position of navigation devices of a submerged submarine.

10. Process according to claim 5, characterised in that it is used to coordinate a plurality of underwater vessels for measuring, counter-measures or intervention, and in that the "floating" vessels are rigidly connected to the ice floe.

* * * * *

UNITED STATES PATENT AND TRADEMARK OFFICE
CERTIFICATE OF CORRECTION

PATENT NO. : 5,579,285
DATED : November 26, 1996
INVENTOR(S) : Hubert Thomas

It is certified that error appears in the above-identified patent and that said Letters Patent is hereby corrected as shown below:

Title page,
Item [57], ABSTRACT,
Line 2, please delete "manned" and substitute therefor -- unmanned --.
Line 3, please delete "manned floating vehicle" and substitute therefor -- unmanned floating vessel --.

Column 11,
Lines 43, 46, 59 and 63, please delete "radar" and substitute therefor -- radio --.
Line 62, please delete "navigation radar signals" and substitute therefor -- communication radio signals --.

Column 12,
Line 9, please delete "radar" and substitute therefor -- radio --.

Signed and Sealed this

Twenty-second Day of June, 2004

JON W. DUDAS
*Acting Director of the United States Patent and Trademark Office*